United States Patent [19]
Bertrand

[11] 3,973,093
[45] Aug. 3, 1976

[54] SEAT BELT BUCKLE SWITCH HAVING PLURAL OPERATORS

[75] Inventor: Jacques R. Bertrand, Paris, France

[73] Assignee: Societe Parisienne d'Accessoires Automobilies Klippan, S.A.R.L., Paris, France

[22] Filed: Nov. 25, 1974

[21] Appl. No.: 526,561

[30] Foreign Application Priority Data
Mar. 7, 1974 France .............. 74.23126

[52] U.S. Cl. .................. 200/61.58 B; 200/153 P
[51] Int. Cl.² .................. H01H 3/32; H01H 21/36
[58] Field of Search ............ 200/61.58 R, 61.58 B, 200/153 P, 158, 161, 156, 61.53

[56] References Cited
UNITED STATES PATENTS

| | | |
|---|---|---|
| 3,015,705 | 1/1962 | Dull .............................. 200/153 P X |
| 3,226,504 | 12/1965 | Gallistel et al. .................. 200/61.53 |
| 3,311,188 | 3/1967 | Gutshall ................ 200/61.58 B UX |
| 3,756,339 | 9/1973 | Cornelison, Jr. et al. 200/61.58 B X |
| 3,769,481 | 10/1973 | Raab ................................. 200/161 |
| 3,781,497 | 12/1973 | Stephenson et al. .. 200/61.58 B UX |

Primary Examiner—James R. Scott
Attorney, Agent, or Firm—Ernest D. Buff; Jonathan Plaut

[57] ABSTRACT

A device in a seat belt buckle for motivating and de-energizing electrical circuitry for activating and deactivating a force suppression device which acts in a seat belt retractor. The device includes both fixed and movable contacts and linkage structure which is activated and deactivated by activation of push-button structure on the buckle.

9 Claims, 12 Drawing Figures

SEAT BELT BUCKLE SWITCH HAVING PLURAL OPERATORS

The present invention relates to a control device, in particular for a web return force eliminator. The device according to the present invention, although specially intended to be applied for the control of a web return force eliminator is not limited to this application and can be used in a general way each time it is wished to remote control the opening and closing of a circuit by means of a control device comprising a first control member which, when operated, opens the circuit if the latter is closed but has no effect if the circuit is already open, and a second control member which, each time it is operated, puts the circuit into the reverse state of that which it was before the maneuver.

The control device according to the present invention applies more particularly to the return force eliminator such as is described in French Pat. application No. 74/17368 filed on May 17, 1974, under the title: "Return Force Eliminator Device For Automatic Web Retractor", in the name of the Societe Parisienne d'Accessoires Automobiles Klippan S.A.R.L. In this application is described a return force eliminator device for automatic web retractor and more particularly for automatic locking safety belt retractor or emergency locking retractor. The return force eliminator device for automatic web retractor described in the above-mentioned application comprises means able to be engaged on a pinion connected to the winding and unwinding movement of the belt, these means include a catch normally at rest against a fixed stop and positioned in relation to the latter in such a way that these means are engaged: when the web is unwound, the catch moves away from the stop, then, when the web is rewound this catch comes back towards the stop and reaches it when the rewound length is equal to the unwound length. In this return force eliminator device, the means able to be engaged are either mechanically controlled, or controlled by a coil which effects engagement when it is energized.

The present invention relates more specifically to a coil energizing control device for the return force eliminator device alternative which contains such a coil. The control device according to the present invention is intended to open or close the coil energizing circuit as the user requires.

According to a feature of the present invention, the coil is systematically de-energized when the user operates the seat belt's uncoupling button.

According to another feature of the present invention, the coil intended to engage the return force eliminator device is de-energized when the safety belt is put into position by the user, i.e. when the belt tongue engages in the belt fastening buckle.

The device according to the present invention is described with regard to its application to the control of a coil located in a return force eliminator device. However, the device according to the present invention is capable of much more general applications and can be used each time it is wished to control an apparatus by means of two control organs where the one controls stopping only and is inoperative if the apparatus is already stopped, while the other alternatively controls stopping and running, i.e. closing and opening of a circuit.

In a general manner, the structure and operation of the device according to the present invention can be analyzed as follows: the control device has two control members, the first one being the normal tongue unlocking button, the second one being an additional button used to put the return force eliminator device into service or out of service. These two buttons are designed in such a way that, when the first button is operated to release the tongue, it automatically puts the return force eliminator device out of service if it were to be in service, but does not have any effect if the return force eliminator device were already out of service.

Assuming that the web is at rest, i.e. completely wound up on the reel and the return force eliminator device is in the out of service position, the user pulls the web and buckles up the belt; he then leans forward just a little and operates the second button which puts the return force eliminator device out of service. The web then protects the user but the return force eliminator device acts in such a way that the strap does not lean on the user's chest when he is in a normal position. He can then make a second setting to the length of web which must normally remain unwound as described in the above-mentioned patent application, and can put the return force eliminator device back into service by pressing the second button once again.

When unbuckling the safety belt, two cases can occur:
- the return force eliminator device is out of service, the rewinding of the web is done normally as with a standard retractor;
- the return force eliminator device is in service, so if the first button were not connected to the second button, the web would not be rewound when unbuckling but, according to the second invention, the first button puts the return force eliminator device out of service simultaneously with the unbuckling operation, in such a way that the web is automatically rewound when the belt is unbuckled.

Assuming now that the web is fully wound up at rest and that the return force eliminator device is in service, the user can pull the web and buckle the belt, but by doing that, he is going to activate the return force eliminator device and, in order to be able to adjust the web to have the convenient slack, he must push the second button twice (once to put the return force eliminator device out of service and adjust the web slack required, and a second time to put the return force eliminator back into service). According to a particular form of the buckle, the fact of inserting the tongue into the buckle engages the first button which automatically puts the return force eliminator device into the out of service position. It will then be necessary to push the second button once only after adjusting the appropriate web slack.

According to an embodiment of the present invention, the control device is made in the form of a rotary element which is driven by the first control member only when the position of the rotary element corresponds to a "running" position of the controlled apparatus and is caused to rotate each time the second control member is actuated.

According to a more particular embodiment of the present invention, the control device comprises two push-buttons, the first being the normal belt-tongue release button and the second being an additional button for putting the return force eliminator device into the "running" or "stop" position. The rotary member can have the form of a star containing a series of short prongs and a series of long prongs of equal number and arranged in such a way that the long prongs can be actuated by the first or the second button while the short prongs can be actuated only by the second push-button. The rotary element is connected to an element making a contact in such a way that each time a long prong has just been pushed, the associated electric circuit is to be found in an open position while when a short prong has been pushed, the associated electric circuit is to be found in a closed position.

According to another embodiment of the present invention, the movements of the first and of the second push-button respectively, control the movement of a first and a second pinion interconnected by an intermediate pinion. The first and second pinion then comprise a series of driving means, designed in such a way that the second gear is driven for double the number of positions as as the first gear.

According to yet another embodiment of the present invention, the device according to the present invention contains two switches respectively monostable and bistable, in series, the first being indirectly operated by the first control member while the second is directly operated by the second control member.

According to a supplementary alternative, the device in the present invention contains one switch only which is controlled by the position of the second control member, the position of the second control member being moreover determined either directly by the user, or by the action of the first control member.

The present invention will be clearly understood from the following description made in relation to the enclosed drawings in which.

The particular embodiments of the present invention are described here in connection with a fastening buckle and a safety belt. This fastening buckle comprises a first push-button 1 mounted so as to be able to move a locking element 2 designed to accept the tongue 25 (see FIG. 6) of a safety belt and to hold it inside the body 3 of the belt buckle. Return means not represented exert a force which tends to bring the push-button 1 towards its furthest position to the left as per the view shown in FIG. 1. A second push-button 4 can move parallel to the button 1 and independently from it by means of return means not represented. The push-buttons 1 and 4 respectively comprise bars 8 and 9 which extend parallel to the direction of movement of the push-buttons. These bars are supported appropriately by elements integral with the body of the buckle.

A rotary element able to turn in a plane parallel to the plane of the bars 8 and 9 comprises a series of alternately long and short radial arms, the number of short arms being equal to the number of long arms. These arms are mounted on a shaft 7 perpendicular to the bars 8 and 9 so as to turn with it and extend, when they pass in front of the end of the bars 8 and 9, in such a way that a long arm can be moved either by the end of the bar 8, or by the end of the bar 9 when one of the buttons 1 or 4 is pushed while a short arm can only be moved by the end of the bar 9. The angle separating the arms is such that, when the rotary element has been moved by one of the push-buttons, the following arm is to be found brought to a vertical position so that, when the push-button returns to its initial position, a new arm is always to be found in front of the ends of the bars of the push-buttons. It can therefore be seen that the rotary element turns the shaft 7 step by step. If it is button 1 which is operated, a step forward will only take place if it is a long arm which is to be found in front of the end of the bar 8 at the beginning of the operation - on the contrary if it is the button 4 which is operated, the shaft 7 will take a step forward for each maneuver of the button 4. In order to be certain that the end of the bars 8 or 9 is not going to slide on the side edge of the arm of the rotary element which is being operated, these arms are manufactured with an extra thickness at their end, 6a for the long arms and 6b for the short arms. In order for the arms to be able to be moved by the ends of the bars 8 and 9, it is necessary for the arm which is going to be operated to be in the plane of the bars 8 and 9. However, during later rotation of the rotary element, the arm which follows the arm made to move must be prevented from striking against the lower side edge of the bar 9 during the maneuver. For this (see FIG. 1) a slide 10 is provided, a part of which covers the bars 8 and 9 in a parallel direction to the latter so that a side edge of the slide corresponds to the end of the bars 8 and 9 when the push-buttons are at rest. The slide 10 comprises, in addition, an inclined part extending towards the bottom and coming back into the plane of the bars 8 and 9 in order to deflect the arm of the rotary element which follows the arm made to move by one of the push-buttons 1 or 4. In order for the arms of the rotary element to be able to move easily on this slide, before coming back into the plane of the bars 8 and 9 of the push-buttons, it is essential for these arms to be made from an elastic material like, for example, a spring steel strip.

Figure 2:
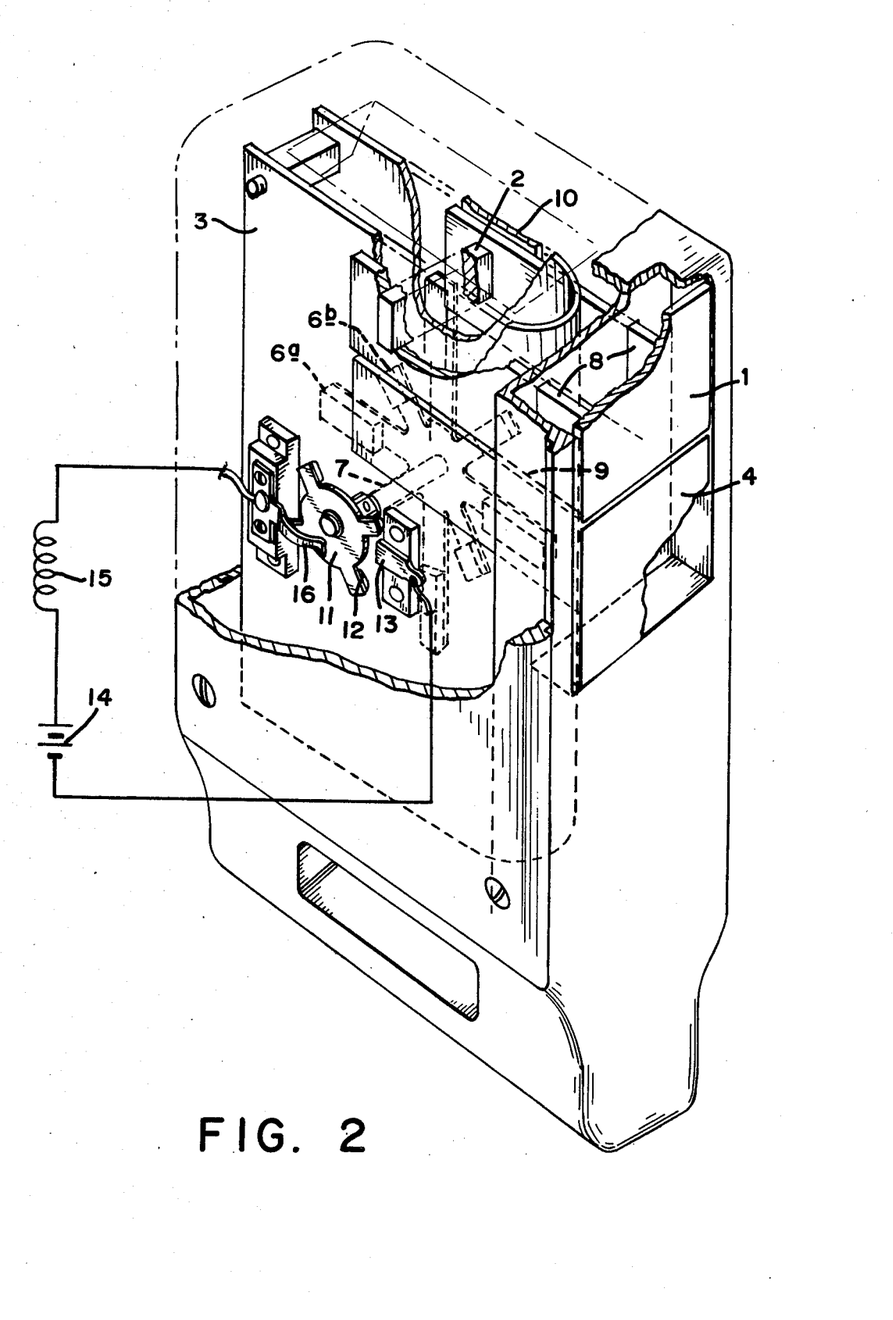
FIG. 2 shows the opposite side to that shown in FIG. 1 and includes the circuitry.
Figure 2A:
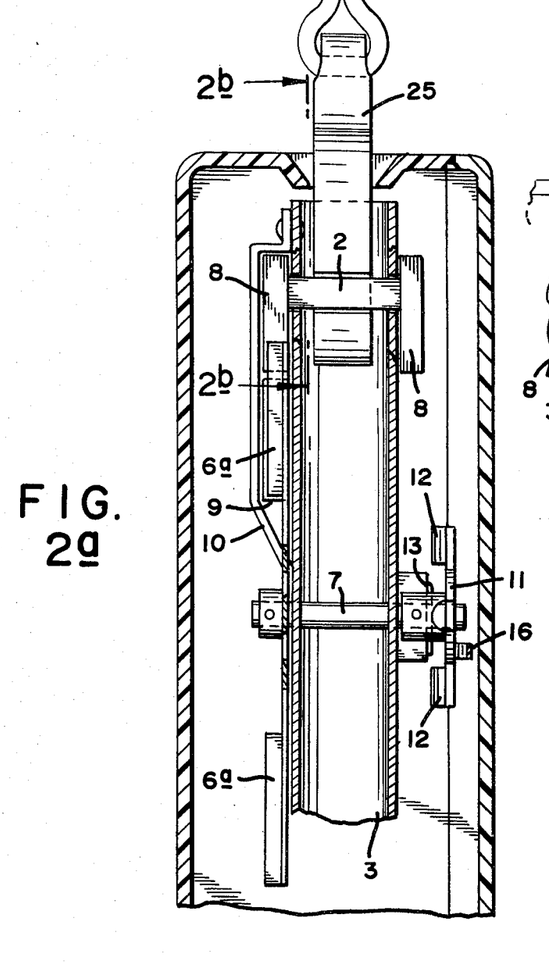
FIG. 2a is a sectional view taken along line 2a—2a of FIG. 1.
Figure 2B:
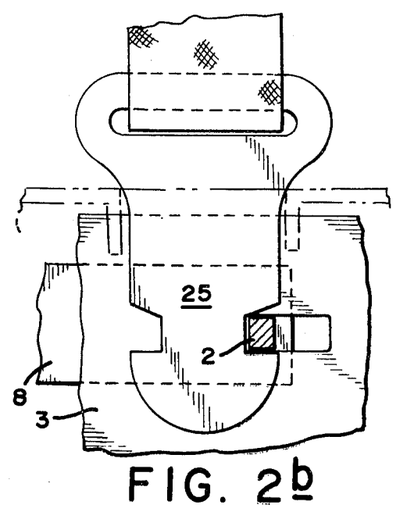
FIG. 2b is a sectional view taken along line 2b—2b of FIG. 2a showing the cooperation of the tongue.
Figure 3:
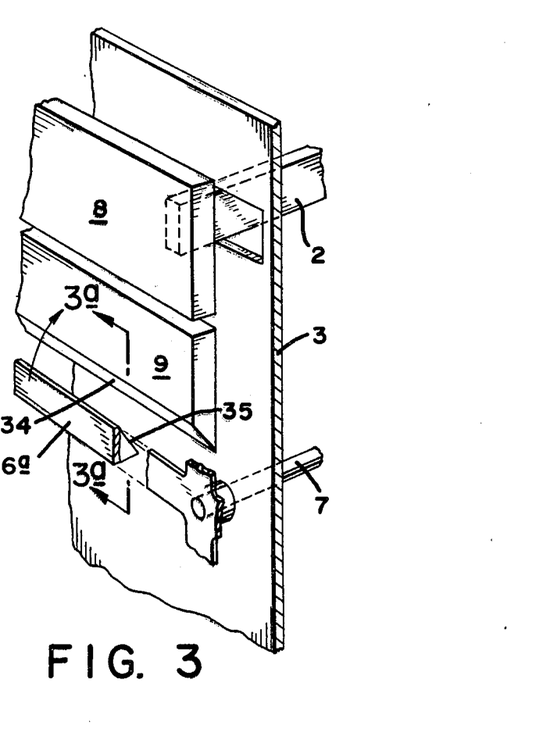
FIG. 3 is a perspective view of the ends of the bars showing an alternative deflecting device.
Figure 3A:
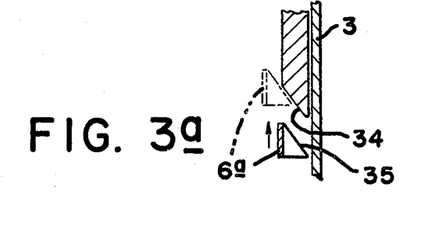
FIG. 3a is a sectional view along line 3a—3a of FIG. 3 further illustrating the deflecting means.

In FIGS. 3 and 3A which is an end view of one of the arms of the rotary element seen from the arrow 2B in FIG. 2, it can be seen that the section of the arm comprises a sloping part 35 directed upwards and inwards and which, when the rotary element turns, comes to work together with the sloping part 34 of the bar 9 in order to deflect the arm until the moment when the latter, having reached the end of of the bar 9, can come back into the plane of the bars 8 and 9, at the end of them.

Figure 1:
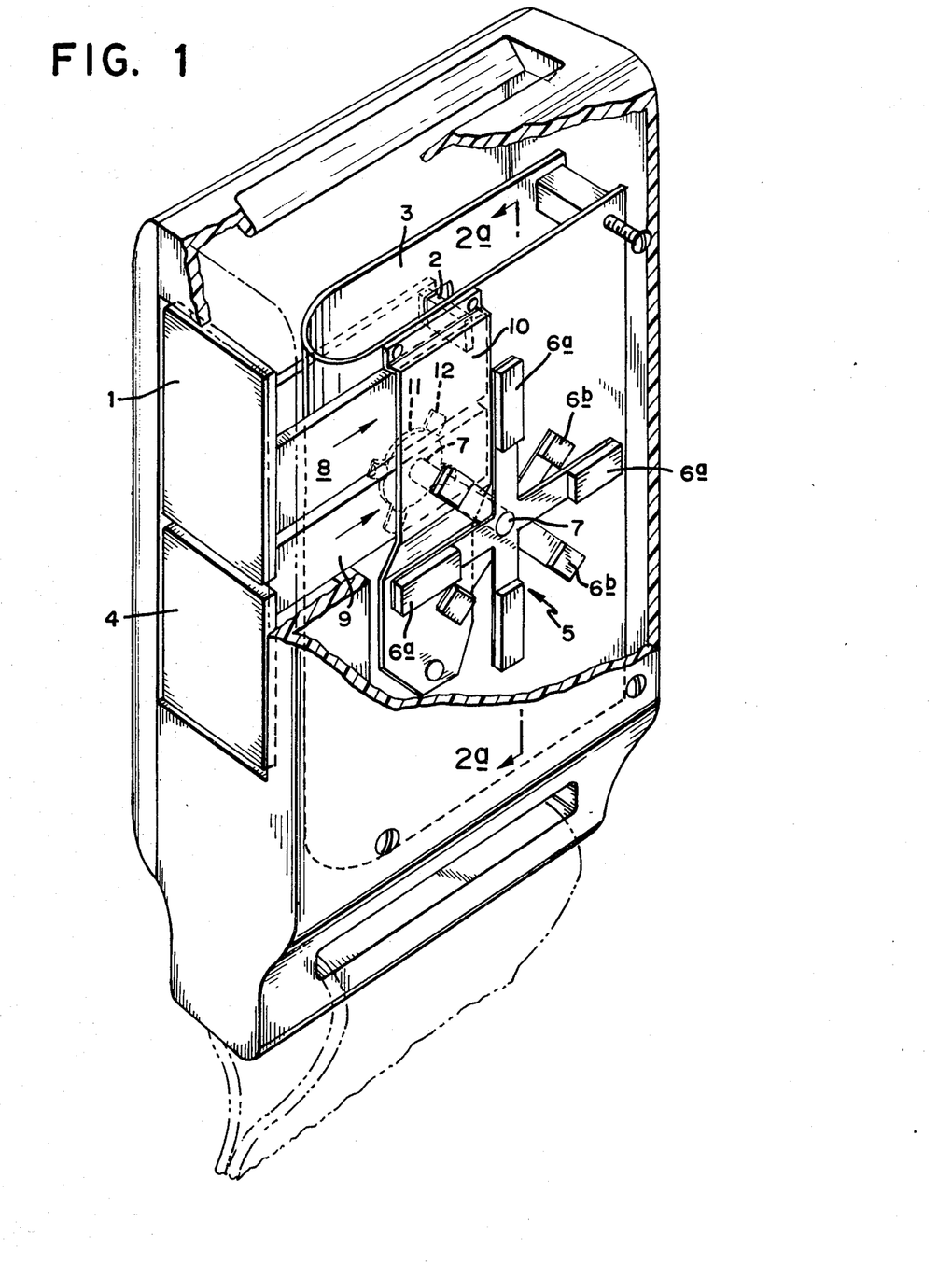
FIG. 1 represents a view in perspective of an embodiment of the present invention.

Referring to FIGS. primarily 1 and 3, one finds the rotary element 5 and the shaft on which it is mounted.

The shaft 7 bears a second rotary element 11 as well which bears contacts 12 on arms the angular position of which corresponds to that of the short arms of the rotary element 5. The number of contacts 12 is therefore equal to the number of short arms of the rotary element 5. A fixed contact 13 constitutes a switch with the moving contacts 12. The contact 13 is connected in series with a source of supply 14 and to the coil 15 which serves to engage the return force suppression device. The circuit is completed by an electrical connection between the coil 15 and the contacts 12 via a friction contact 16 in permanent contact with the part 11. When the switch 12, 13 is closed, the coil 15 is energized and the return force eliminator device is in service, while when a contact 12 is not to be found opposite the contact 13, the coil 15 is not energized and the return force eliminator device is out of service. The position of the fixed contact 13 is such that, when a short arm of the element 5 is to be found in a vertical position against the end of the bar 9, the switch 12, 13 is open, while when it is a long arm which is in a vertical position against the end of the bar 9, the switch 12, 13 is closed.

Let us assume that an end 6b is opposite the end of the bar 9 - there is no contact between the contacts 12, 13. The circuit is open and the return force eliminator device is out of service. If the button 1 is pressed, there is no effect since the part 6b does not extend opposite the end of the bar 8 of button 1. If button 4 is pressed, then the part 5 turns one step and a contact 12 comes into contact with the contact 13 which puts the return force eliminator device into service. This rotation by one step of the part 5 brings an element 6a opposite the ends of the bars 8 and 9, simultaneously with the putting into service of the return force eliminator device.

By now taking the instance where an element 6a is opposite the ends of the bars 8 and 9, it can be seen that if button 4 is pressed, the part 5 is turned by one step and we come back to the beginning of the previous situation. This time it is the same if button 1 is pressed. This means therefore that when unbuckling the safety belt, the return force eliminator device is going to be automatically put out of service and the web can be rewound normally.

It will likewise be noticed that if by mistake, when the belt is wound up, button 4 has been operated, the return force eliminator device is to be found in service while the belt is not buckled. When the user goes to buckle his belt, the tongue 25, on entering the buckle, moves the locking element 2 and by virtue of this the bar 8 of the push-button 1. The rotary element then moves one step and puts the return force eliminator device out of service, and the user can therefore adjust the length of web in a normal manner before putting the return force eliminator device back into service by actuating push-button 4. It can thus be seen that, even if a clumsy movement has put the return force eliminator device into service while the web is fully wound up, the device according to the present invention permits automatic return to normal state of use of the return force eliminator device in conjunction with a retractor.

In other terms, each time the button 4 is pressed, the part 5 is turned by one step, which makes the return force eliminator device pass alternately from the in service position to the out of service position or from the out of service position to the in service position. When button 1 is pushed, then: if the return force eliminator device is in an out of service position, nothing happens (the rotary element 5 is not moved); if the return force eliminator device is in service, it is put into an out of service position (the part 5 is moved by one step).

In order to improve the quality of the contacts, as many fixed contacts 13 as contacts 12 can be contemplated, the contacts 13 then being in parallel and arranged in such a way that the contacts 12 and 13 simultaneously close and open the circuit. There can likewise be one single turning contact 12 and several fixed contacts 13 in parallel and arranged in such a way that the circuit is closed for the positions already described for the rotary element 5.

The contacts 12 and 13 can likewise be arranged at the same end of the shaft 7 as the rotary element 5 - it is then not necessary for the shaft 7 to pass through the buckle and it can be supported by a U-shaped clamp on one of the sides of the buckle.

Figure 4:
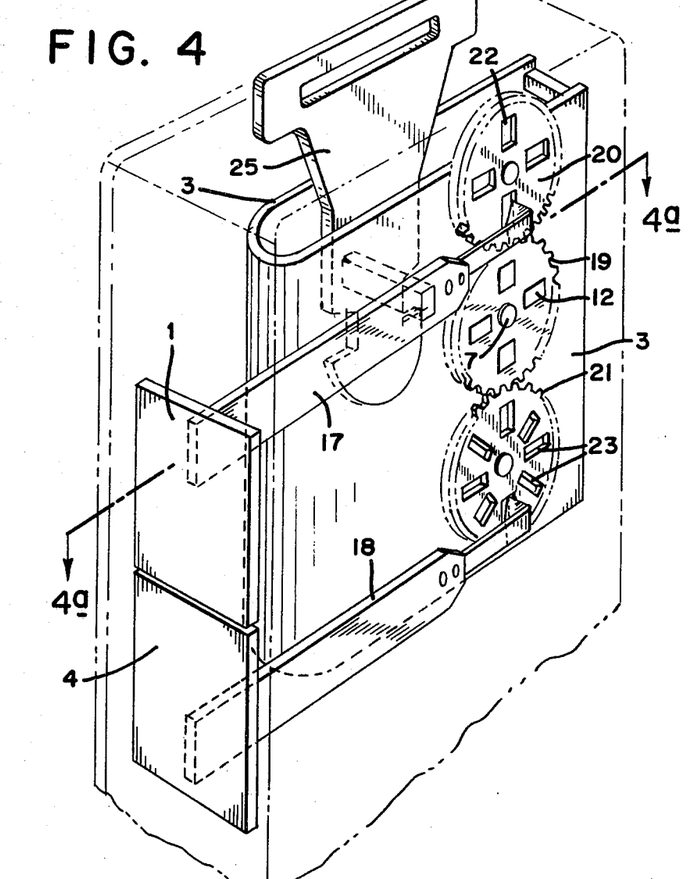
FIG. 4 is an alternative embodiment enclosed in a casing.
Figure 4A:
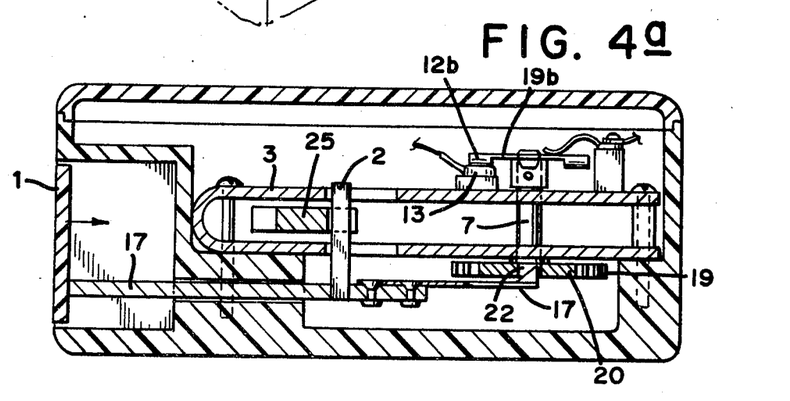
FIG. 4a is a sectional view along line 4a—4a of FIG. 4.

FIG. 4 represents an alternative embodiment of the device according to the present invention. According to this embodiment, buttons 1 and 4 have arms 17 and 18, with a flexible end piece thereon, respectively. A pinion 19 mounted on the shaft 7 meshes with two pinions 20 and 21, the pinion 19 bearing contacts 12 (or is rigidly fastened to a shaft 7 which bears a wheel 19b with contacts 12b). The moving contacts 12 are designed to close a circuit with a fixed contact 13 as per the embodiment described above.

The pinion 20 is manufactured with slots 22 which come opposite the end of the arm 17 one after the other when the pinion 20 turns two steps. The number of slots 22 is equal to the number of contacts 12.

The pinion 21 comprises slots 23 which come opposite the end of the arm 18 one after another each time the pinion 21 turns one step. The number of slots 23 is equal to twice the number of slots 22.

The arms 17 and 18 carry catches at their end perpendicular to their plane. These catches can enter into the slots and respectively drive the pinions 20 and 21 in the direction indicated and retract when buttons 1 and 4 are operated, which would have the tendency to drive pinions 20 and 21 in the opposite direction. In the embodiment in FIG. 4, the arms 17 and 18 therefore extend respectively below the center lines of the pinions 20 and 21. In order to prohibit any movement of the pinions 20 and 21 in the unwanted direction, the intermediate pinion 19 can be fitted with a non-return pawl. The arms 17 and 18 will be manufactured from a sufficiently elastic material in order for the catches to enter into the slots to drive the pinions 20 and 21 and to come out when the buttons 1 and 4 are biased back to the rest position.

Each time button 4 is pressed, the pinion 21 turns one step and drives the intermediate pinion 19 one step, which puts the contact 12 into contact or out of contact with the contact 13 and simultaneously drives the pinion 20 one step. It will therefore be noted that as the number of slots 22 of the pinion 20 is equal to half the number of slots 23 of the pinion 21, the catch borne by the arm 17 can only enter into a slot 22 when the pinion 20 has moved two steps.

The form of the slots 22 and 23 and of the catches carried by the arms 17 and 18 will be designed, as is well known by the skilled man, in such a way that the catch remains in the slots 22 and 23 respectively, when the buttons 1 and 4 respectively are pushed, but come out easily when the buttons 1 and 4 respectively are brought back to the position of rest by their return device. Operation will therefore be identical to that of the previous embodiment, i.e. every time button 4 is operated the pinion 21 will turn one step putting the circuit alternately into an open and closed position, while the catch carried by the arm 17 will not be able to go back into a slot 22 until the latter is in a suitable position, i.e. for a closed circuit position; for an open circuit position, the catch carried by the arm 17 will slide on the side of the pinion 20 without turning it. In another alternative embodiment, the intermediate pinion 19 can be suppressed - the pinions 20 and 21 will then turn in the opposite direction and the contacts 12 will be borne either by one of them, or by another part integral with their movement. If in this embodiment, the arm 17 extends below the center-line of the pinion 21, the direction of the slots must be reversed in order not to impede the movement of the latter. It can be seen that numerous alternatives are possible without leaving the framework of the present invention.

Figure 5:
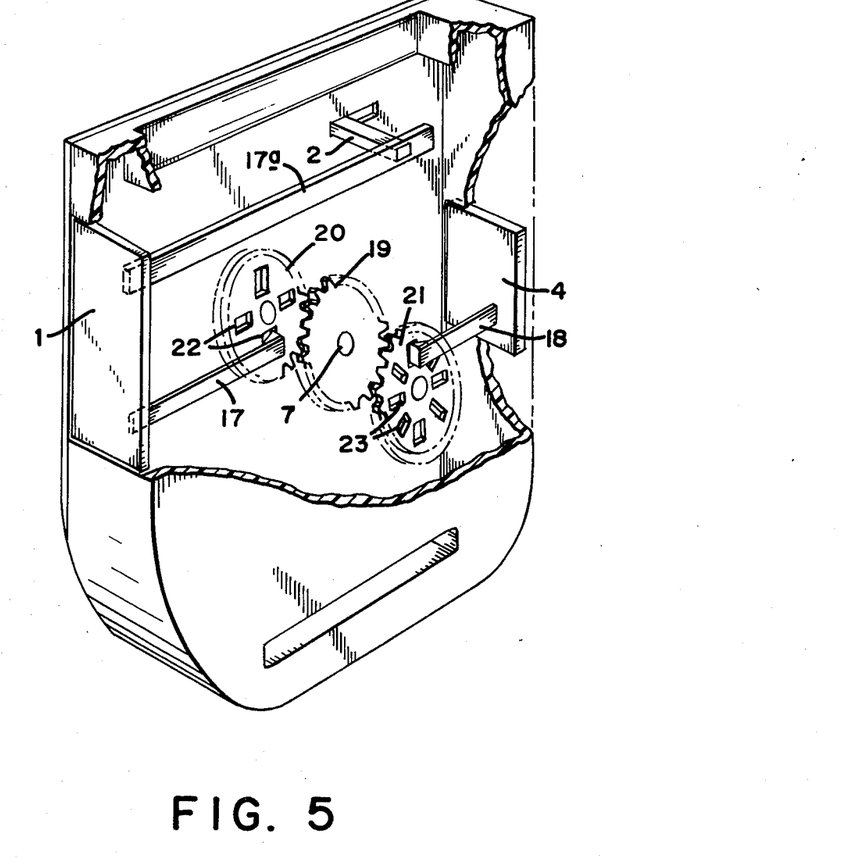
FIG. 5 is an alternative embodiment with the casing broken away to show the pinions and bars.

FIG. 5 represents an alternative embodiment of the device according to FIG. 4. Buttons 1 and 4 are positioned opposite each other on the buckle. In this case, the arm 17, with an arm 17a, drives the pinion 20 below the center-line of the latter and the button 4 drives the pinion 21 above the center-line of that pinion, in such a way that the pinion 19 is always driven in the same direction when the button 1 or the button 4 is operated; the device is identical to the previous device in other respects.

Figure 6:
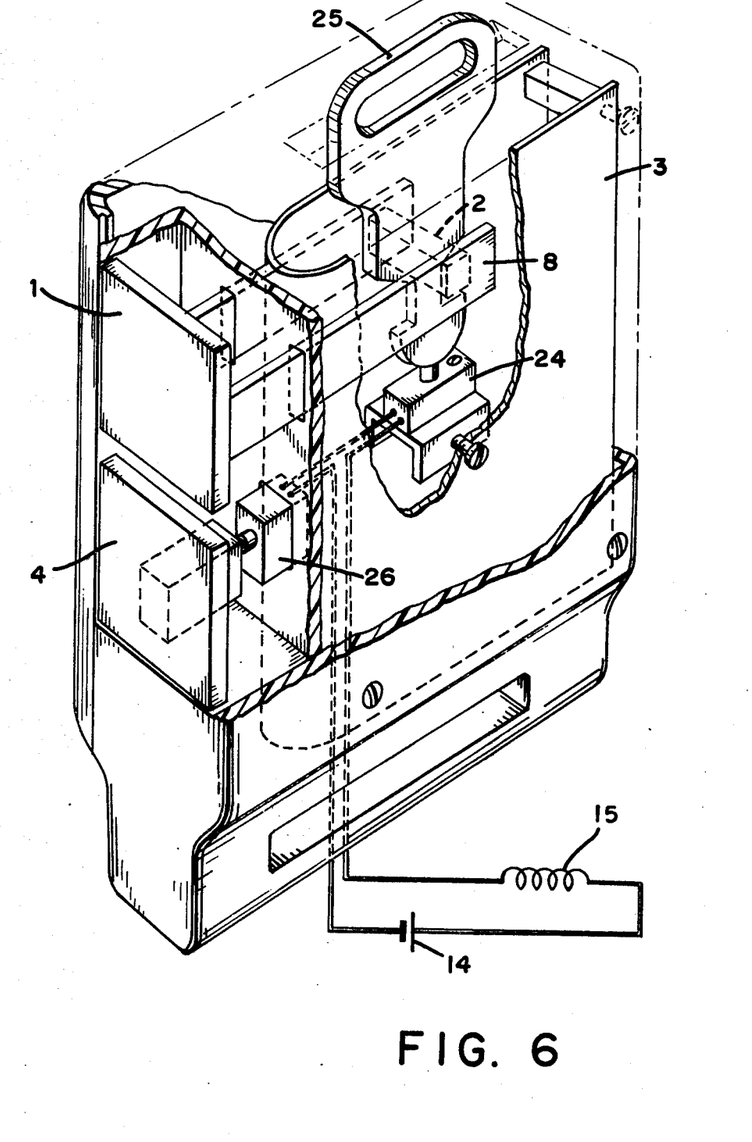
FIG. 6 is an alternative embodiment with two switches and enclosed in a casing.

FIG. 6 represents another alternative embodiment of the present invention in which the buckle comprises two switches 24 and 26, connected in series in the energizing circuit of the engaging coil of the return force eliminator device. Switch 24 is a monostable, push-button switch, normally open and arranged so as to be actuated by the tongue 25 when the latter is inserted in the buckle. The switch 24 is therefore open each time the belt is in the unbuckled position and closed when the belt is buckled.

The second switch 26 is a bistable, push-button switch arranged so as to be actuated by the end of the control button 4. Each time it is operated, the switch 26 passes alternately from an open position to a closed position and from a closed position to an open position.

When the tongue is put into place in the buckle, it closes the switch 24; if the switch 26 is in a closed position, the return force eliminator device is in service; if the switch 26 is open, it is sufficient for the user to push the button 4 once in order to put the return force eliminator device into service. When unbuckling, the switch 24 opens, which has no effect if the switch 26 is already in an open position, but puts the return force eliminator device into the out of service position if it is in fact in service.

The only difference from the device described above is that if the switch 26 is closed when buckling the seat belt, the return force eliminator device is automatically in service before the user has been able to adjust the web with the desired slack; the user is then compelled to operate button 4 once in order to put the return force eliminator device out of service and adjust the slack to what he wishes, then again operate button 4 in order to put the return force eliminator device back into service.

Figure 7:
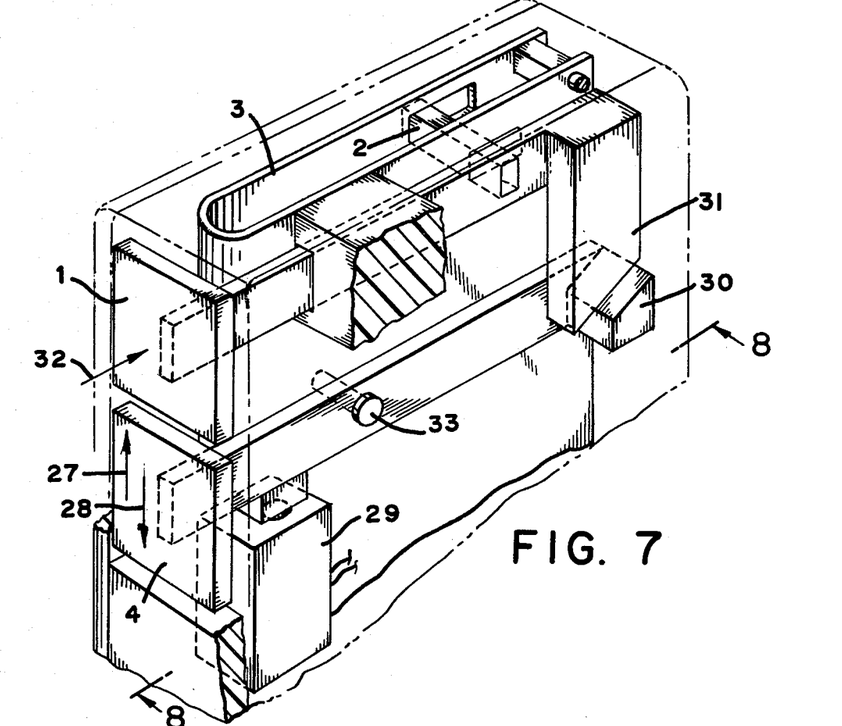
FIG. 7 is an alternative embodiment with one switch, but enclosed.
Figure 8:
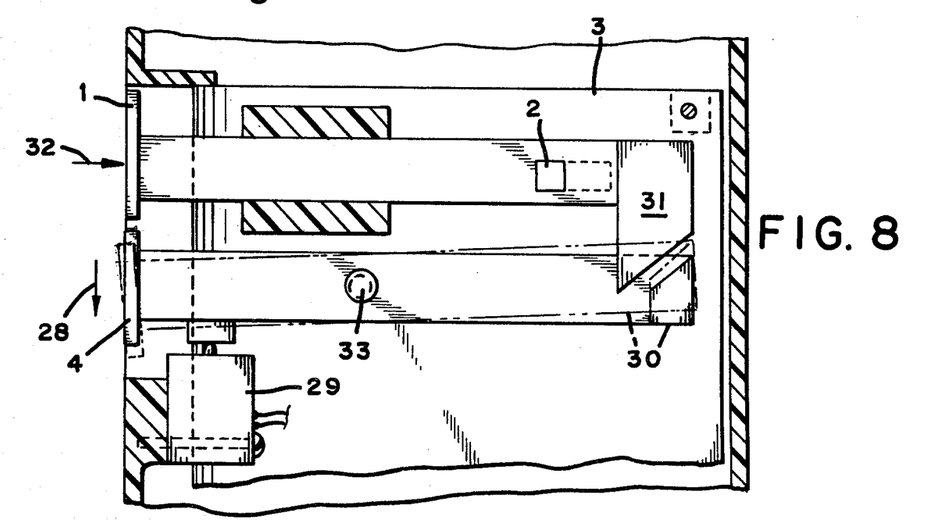
FIG. 8 is a sectional view along line 8—8 of FIG. 7.

FIG. 7 and FIG. 8 represent another alternative embodiment of the device according to the present invention in which the button 4 is not a push-button but a button which is moved sideways in the directions of the arrows 27 and 28. Button 4 then has two stable positions in which it is maintained by a system of springs (not shown). The energizing circuit of the coil comprises only one single monostable, push-button switch 29, normally open. When button 4 is in a position corresponding to that of arrow 28, it closes the switch 29, thus putting the return force eliminator device into service. When it is put into the position corresponding to arrow 27, button 4 opens the switch 29 and thus puts the return force eliminator device out of service.

Switch 29 could be connected in series with a switch similar to switch 24 in FIG. 6, the result obtained then being similar to that described with regard to the device of FIG. 6.

According to the embodiment of FIG. 7, the coil energizing circuit only contains the switch 29 and the button 4 contains an extension 30 fitted with a sloping ramp designed to work together with a corresponding sloping ramp of an extension 31 of the button 1. On the other hand, the button 4 can pivot around a pin 33 the center-line of which is parallel to the plane of the sloping ramps of the extensions 30 and 31. The switch 29 is arranged under the bar of button 4 and in the part contained between the pin 33 and the operating end of the button 4. Button 4 can be operated therefore independently from button 1 and permits the return force eliminator device to be put into service or out of service depending on the user's wishes. If button 4 is in a position corresponding to arrow 27, the return force eliminator device is out of service and action on button 1 does not change the situation at all; but if button 4 is in a position corresponding to arrow 28, the return force eliminator device is in service and when button 1 is actuated at the time of buckling or unbuckling of the safety belt, the sloping part of the extension 31 of the button 1 works together with the sloping part of the extension 30 of the button 4 in order to bring the latter into the direction of arrow 27 and to put the return force eliminator device into an out of service position. The single switch 29 could likewise be replaced by a bistable tumbler switch arranged vertical to the pin 33 so as to rock from an open position to a closed position, and vice versa, when button 4 is actuated.

The present invention is not limited to the embodiment examples that have just been described - it is on the contrary capable of alternatives and modifications which will be evident to the skilled man.

I claim:

1. Safety belt buckle which includes a control device for opening and closing a circuit for an energizing device, wherein said device comprises a first control member arranged in the buckle so as to bring about the opening of the circuit if it is closed and to be without effect if the circuit is open, a second control member arranged in the buckle so as to open the circuit if it is closed and to close it if it is open, a shaft mounted in the buckle, a rotary element borne by the shaft with long and short arms on said element, the long arms operatively engageable by the two control members, the short arms operatively engageable by the second control member, a first pinion the rotation of which is controlled by the first control member, and a second pinion the rotation of which is controlled by the second control member, the two pinions gearing with one another, and controlling the position of at least one turning contact, opening and closing the circuit depending on the position of the pinions.

2. Device according to claim 1 wherein the control members contain bars the ends of which work together with the arms of the rotary element in order to make it turn.

3. Device according to claim 2 wherein the short arms include a contact cooperating with a fixed contact.

4. Device according to claim 3, said shaft bearing a part carrying contacts corresponding to the short arms of the rotary elements and engaging fixed contacts.

5. Device according to claim 1, which further comprises at least one intermediate pinion gearing with the first and second pinion.

6. Device according to claim 1, wherein the first and second pinion comprise slots, the number of slots in the second pinion being twice as many as in the first pinion and wherein the control members carry catches designed in such a way as to be able to work together with the slots in the pinions, so as to turn the pinions in one single direction, when the control members are operated.

7. Device according to claim 1, wherein the turning contacts are carried by one of the pinions and can engage with a fixed contact.

8. Safety belt buckle according to claim 1, wherein the control members are push-buttons placed on the same side of the buckle.

9. Safety belt buckle according to claim 1, wherein the control members are push-buttons arranged on two opposite sides of the buckle.

* * * * *